United States Patent
Kumagai et al.

(10) Patent No.: US 11,982,212 B2
(45) Date of Patent: May 14, 2024

(54) HOLLOW ENGINE VALVE AND PRODUCTION METHOD THEREOF

(71) Applicant: FUJI OOZX Inc., Kikugawa (JP)

(72) Inventors: Takaaki Kumagai, Kikugawa (JP); Koji Kushima, Kikugawa (JP)

(73) Assignee: FUJI OOZX INC., Kikugawa (JP)

( * ) Notice: Subject to any disclaimer, the term of this patent is extended or adjusted under 35 U.S.C. 154(b) by 0 days.

(21) Appl. No.: 18/028,436

(22) PCT Filed: Mar. 16, 2021

(86) PCT No.: PCT/JP2021/010673
§ 371 (c)(1),
(2) Date: Mar. 24, 2023

(87) PCT Pub. No.: WO2022/195730
PCT Pub. Date: Sep. 22, 2022

(65) Prior Publication Data
US 2023/0358151 A1 Nov. 9, 2023

(51) Int. Cl.
*F01L 3/12* (2006.01)
*B21K 1/24* (2006.01)
*F01L 3/02* (2006.01)
*F16K 49/00* (2006.01)

(52) U.S. Cl.
CPC ............... *F01L 3/12* (2013.01); *B21K 1/24* (2013.01); *F01L 3/02* (2013.01); *F16K 49/00* (2013.01); *F01L 2301/00* (2020.05); *F01L 2303/00* (2020.05)

(58) Field of Classification Search
CPC . F01L 3/12; F01L 3/02; F01L 2303/00; F01L 2301/00; B21K 1/24; F16K 49/00

USPC ............................................. 123/90.48, 90.61
See application file for complete search history.

(56) References Cited

U.S. PATENT DOCUMENTS

| 11,260,448 | B2 * | 3/2022 | Matthias | F01L 3/14 |
| 11,300,018 | B2 * | 4/2022 | Kunitake | F02F 1/24 |
| 11,536,167 | B2 * | 12/2022 | Kunitake | F01L 3/14 |
| 2011/0174259 | A1 * | 7/2011 | Yoshimura | F01L 3/16 |
| | | | | 123/188.2 |
| 2012/0246934 | A1 * | 10/2012 | Morii | B21K 1/22 |
| | | | | 29/890.12 |

(Continued)

FOREIGN PATENT DOCUMENTS

| JP | 1-173305 U | 12/1989 |
| JP | 4-76907 U | 7/1992 |

(Continued)

*Primary Examiner* — Hai H Huynh
(74) *Attorney, Agent, or Firm* — BIRCH, STEWART, KOLASCH & BIRCH, LLP

(57) ABSTRACT

A hollow engine valve includes a shaft portion and an umbrella portion of which diameter is enlarged to form an umbrella shape to be provided on a base end of the shaft portion, a cooling material being enclosed in a hollow portion that is at least formed inside the shaft portion. The shaft portion comprises a first shaft portion in a tip end side, a second shaft portion that is provided in a base end side to have an outer diameter larger than that of the first shaft portion, and a stepped portion formed by a difference in the outer diameters between the first and second shaft portions. A wall thickness of the stepped portion is larger than that of the second shaft portion.

9 Claims, 4 Drawing Sheets

(56) References Cited

U.S. PATENT DOCUMENTS

| | | | |
|---|---|---|---|
| 2012/0304464 A1* | 12/2012 | Morii | B21D 53/84 29/888.45 |
| 2014/0033533 A1* | 2/2014 | Morii | B21K 1/22 29/890.12 |
| 2014/0366373 A1* | 12/2014 | Morii | F01L 3/14 29/888.451 |
| 2017/0234175 A1* | 8/2017 | Morii | B21K 1/22 123/188.3 |
| 2021/0270154 A1 | 9/2021 | Kunitake et al. | |

FOREIGN PATENT DOCUMENTS

| JP | 2017-190759 A | 10/2017 |
|---|---|---|
| WO | WO 2020/100185 A1 | 5/2020 |

* cited by examiner

HOLLOW ENGINE VALVE AND PRODUCTION METHOD THEREOF

CROSS-REFERENCE TO RELATED APPLICATIONS

This application is the U.S. national phase of International Application No. PCT/JP2021/010673 filed 16 Mar. 2021, the entire contents of which is hereby incorporated by reference.

BACKGROUND OF THE INVENTION

Field of the Invention

The present invention relates to a hollow engine valve and a production method thereof.

Description of the Related Art

Conventionally, as an engine valve for flowing an intake gas into a combustion chamber of an engine of a motor vehicle, a ship, and so on and ejecting an exhaust gas from the combustion chamber, a hollow engine valve (simply also referred to as "engine valve" below) inside which a hollow portion is provided to enclose a cooling material such as metallic sodium to reduce a temperature rising is exemplified (see JP 2017-190759 A).

SUMMARY OF THE INVENTION

However, there is concern about insufficient strength owing to increasing of a neck portion temperature for also such a hollow engine valve because a combustion temperature is rising according to strictness of a regulation of carbon dioxide ($CO_2$) emission.

In view of the above disadvantages of the conventional techniques, an object of the present invention is to provide a hollow engine valve of which strength of a shaft portion is increased and a production method thereof.

(1) According to a first embodiment of the present invention, a hollow engine valve includes a shaft portion and an umbrella portion of which diameter is enlarged to form an umbrella shape to be provided on a base end of the shaft portion, a cooling material being enclosed in a hollow portion that is at least formed inside the shaft portion, wherein the shaft portion includes a first shaft portion in a tip end side, a second shaft portion that is provided in a base end side to have an outer diameter larger than that of the first shaft portion, and a stepped portion formed by a difference in the outer diameters between the first and second shaft portions, and wherein a wall thickness of the stepped portion is larger than that of the second shaft portion.

According to the formation of the above (1), it is possible to improve strength of the stepped portion on which maximum bending stress occurs.

(2) According to a second embodiment of the present invention, a hollow engine valve includes a shaft portion and an umbrella portion of which diameter is enlarged to form an umbrella shape to be provided on a base end of the shaft portion, a cooling material being enclosed in a hollow portion that is at least formed inside the shaft portion, wherein the shaft portion includes a main shaft portion in a tip end side and a neck portion that is formed continuously from the umbrella portion to have an outer diameter larger than that of the main shaft portion, wherein a wall thickness of the neck portion is larger than that of the main shaft portion, and, wherein the hollow portion is formed to have a fixed inner diameter at least from the main shaft portion to the neck portion.

According to the formation of the above (2), it is possible to improve strength of the neck portion and make the cooling material move smoothly in the hollow portion.

(3) A method for producing a hollow engine valve according to the first embodiment of the present invention, the hollow engine valve including a shaft portion that has a first shaft portion and a second shaft portion formed continuously from the first shaft portion to have an outer diameter larger than that of the first shaft portion, an umbrella portion of which diameter is enlarged to form an umbrella shape to be provided on an end of the second shaft portion, and a hollow portion that is at least formed inside the shaft portion, wherein the method includes a first step of forming a semifinished product provided with a tubular portion that is cylindrical to have the same outer diameter as the second shaft portion and an umbrella-shaped portion that is arranged on an end of the tubular portion to be in the same shape as the umbrella portion, by forging and drilling a raw material made of special steel, and a second step of forming the shaft portion by drawing the tubular portion of the semifinished product to be reduced in the outer diameter, wherein in the second step, the tubular portion is reduced in the outer diameter to a predetermined specified position in an axial direction of the tubular portion, and the tubular portion is processed to have the first shaft portion that is a portion reduced in the outer diameter, the second shaft portion that is a portion not reduced in the outer diameter, and a stepped portion that is reduced in the outer diameter together with the first shaft portion and is formed by a difference in the outer diameters between the first and second shaft portions, and wherein each wall thickness of the first shaft portion and the stepped portion which are respectively reduced in the outer diameter is made to be larger than that of the second shaft portion.

According to the formation of the above (3), it is possible to produce a hollow engine valve in which strength of the shaft portion is increased.

(4) A method for producing a hollow engine valve according to the second embodiment of the present invention, the hollow engine valve including a shaft portion, an umbrella portion of which diameter is enlarged to form an umbrella shape to be provided on a base end of the shaft portion, a neck portion that is formed in a base end side of the shaft portion continuously from the umbrella portion to have an outer diameter larger than that of the shaft portion, and a hollow portion that is formed at least inside the shaft portion to have a predetermined fixed inner diameter, wherein the method includes a first step of forming a semifinished product provided with a tubular portion that is cylindrical to have an opening at a tip end and an umbrella-shaped portion of which diameter is enlarged to form an umbrella shape to be provided on a base end of the tubular portion, by forging and drilling a raw material made of special steel, and a second step of forming the shaft portion and the neck portion by drawing the tubular portion to be reduced in the outer diameter, wherein in the first step, a neck tapered portion is formed in the base end side of the tubular portion to have a wall thickness larger than that of the tubular portion and an outer diameter exponentially reduced in a tip direction, and wherein the second step includes a first shaping to form a semifinished neck portion by reducing the outer diameter of the tubular portion including the neck tapered portion such that an inner diameter of the neck tapered portion is reduced to be the fixed inner diameter, and a second shaping to reduce the outer diameter of the tubular portion in a tip end side than the semifinished neck portion such that an inner diameter of the tubular portion is reduced to be the fixed inner diameter, and to make the shaft portion that is a portion reduced in the outer diameter and the neck portion that is a portion not reduced in the outer diameter.

According to the formation of the above (4), it is possible to produce a hollow engine valve having the neck portion of which strength is increased and the hollow portion in which the cooling material moves smoothly.

According to the present invention, it is possible to obtain a hollow engine valve of which strength of a shaft portion is increased.

DESCRIPTION OF THE PREFERRED EMBODIMENTS

The present invention is explained in detail by referring to embodiments on the basis of FIGS. 1 to 6 as follows. However, the present invention is not limited to the following embodiments that are given as examples.

First Embodiment

Figure 1:
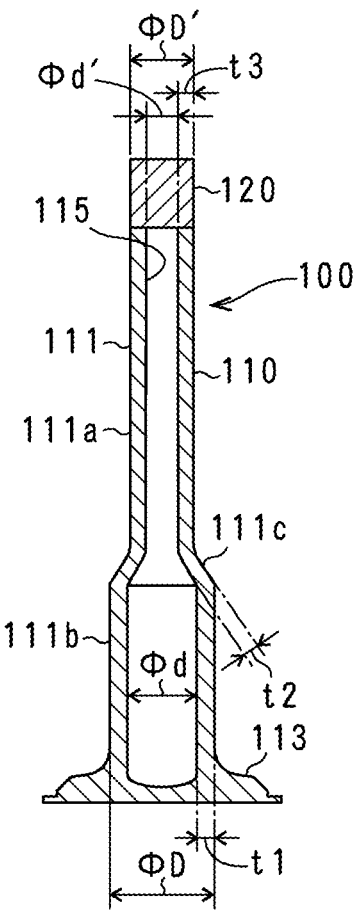
FIG. 1 is a vertical cross-sectional view showing a hollow engine valve of a first embodiment.
Figure 2:
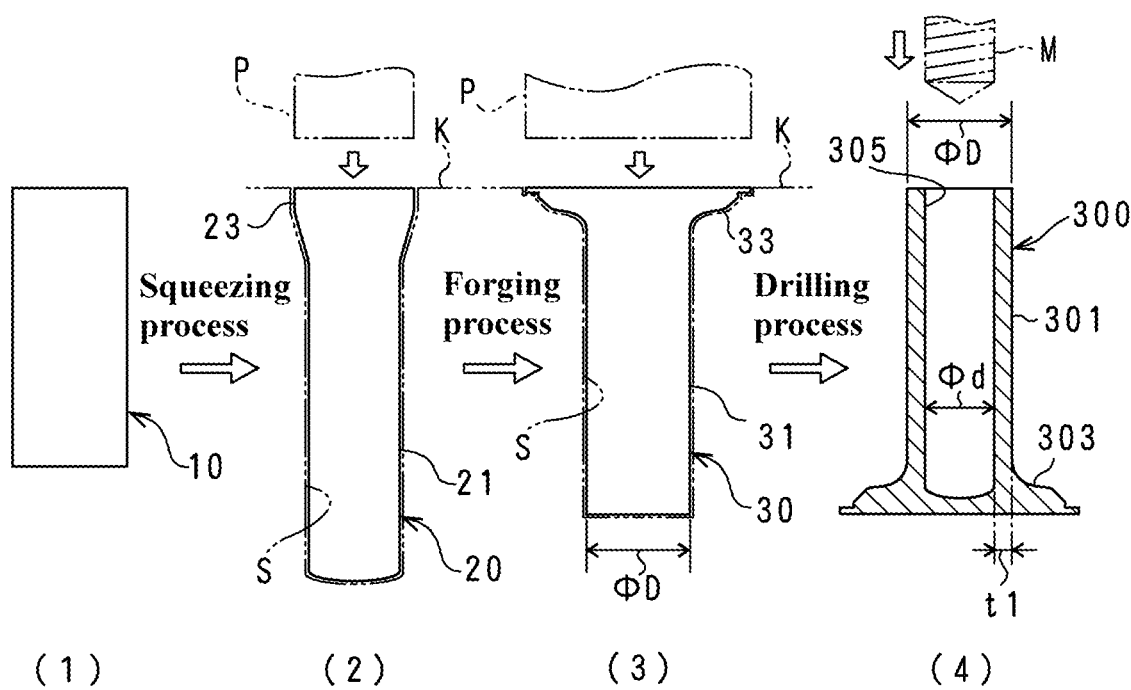
FIG. 2 is a schematic view showing a production process of the hollow engine valve of the first embodiment.
Figure 3:
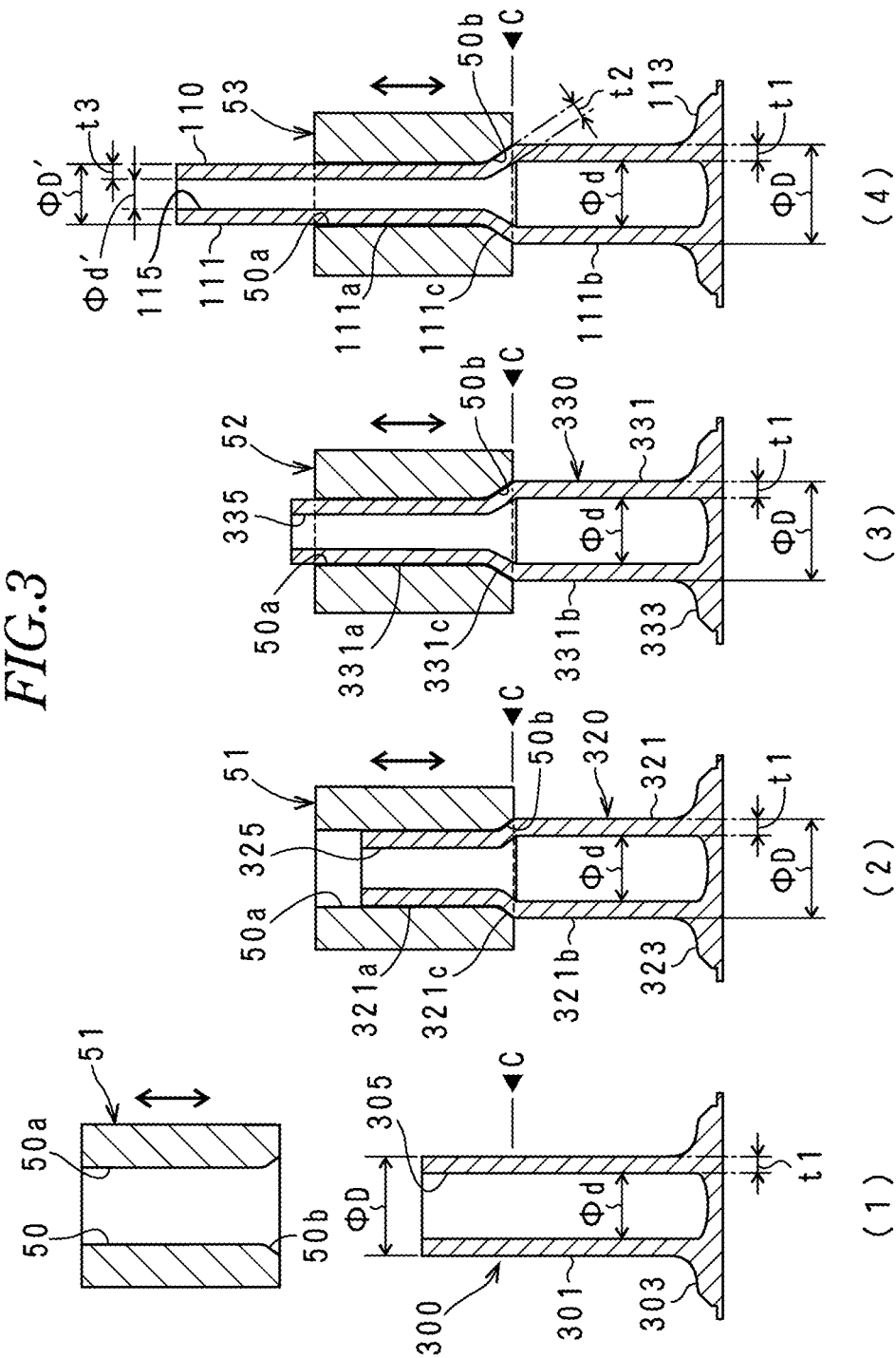
FIG. 3 is another schematic view showing the production process of the hollow engine valve of the first embodiment.

A first embodiment is explained by referring to FIGS. 1 to 3. Incidentally, directions of a hollow engine valve 100 of the present embodiment are explained based on those of the engine valve 100 (a valve head part 110) shown in FIG. 1 (for example, a tip end side (a side of a shaft end part 120) of a shaft portion 111 is indicated as an upper direction, and a base end side (a side of an umbrella portion 113) of the shaft portion 111 is indicated as a lower direction).

(Hollow Engine Valve 100)

The hollow engine valve (simply referred to as "engine valve") 100 is a valve body that is mounted in a cylinder head of an engine (not shown) of a motor vehicle and so forth to be arranged inside an intake and exhaust ports that are communicated with a combustion chamber. When the engine operates, the hollow engine valve moves in an up-and-down direction and enables the intake and exhaust ports to open and close. The engine valve 100 enables an intake gas to be supplied from the intake port into the combustion chamber by opening the intake port and enables an exhaust gas in the combustion chamber to be exhausted from the exhaust port to an out of the combustion chamber by opening the exhaust port.

As shown in FIG. 1, the engine valve 100 includes the valve head part 110 that is a body part and the shaft end part 120 that is a lid part.

The valve head part 110 includes the shaft portion 111 in a round rod shape and the umbrella portion 113 which is formed continuously from a lower end portion of the shaft portion 111 and of which diameter is enlarged downward to form a concentric umbrella shape.

The shaft portion 111 includes a first shaft portion 111a in an upper side, and a second shaft portion 111b that is provided in a lower side to have an outer diameter larger than that of the first shaft portion 111a. Between the first and second shaft portions 111a, 111b, a stepped portion 111c of which diameter is gradually reduced upward to form a tapered shape is formed to continuously provide both shaft portions 111 a, 111b of which the outer diameters are different.

A hollow portion 115 having a bottom and an opening on the upper side is formed inside the shaft portion 111 of the valve head part 110. A shape of the hollow portion 115, that is, an inner shape of the valve head part 110 is substantially similar to an outer shape of the first and second shaft portions 111a, 111b. Concretely, an inner diameter of $\Phi d'$ of the first shaft portion 111a is set to be smaller than that of $\Phi$ d of the second shaft portion 111b, and the shape of the hollow portion 115 in the stepped portion 111c (an inner shape of the stepped portion 111c) is a tapered shape of which diameter is gradually reduced upward.

As shown in FIG. 1, a wall thickness of t3 (for example, 1.6 mm) of the first shaft portion 111a and that of t2 (for example, 1.6 mm) of the stepped portion 111c are larger than that of t1 (for example, 1.0 mm) of the second shaft portion 111b (t3=t2>t1).

Thus, regarding the shaft portion 111, it is possible to improve strength of the stepped portion 111c on which maximum bending stress occurs owing to seating of the engine valve during the engine operation, thereby reducing deterioration and damage of the engine valve 100.

Regarding the valve head part 110, the opening of the shaft portion 111 is closed by uniting (for example, friction welding) and fixing the shaft end part 120 on an upper-end portion of the shaft portion 111 after putting a getter material such as titanium and/or a cooling material such as metallic sodium into the hollow portion 115 (these materials are not shown). Thus, the hollow portion 115 is sealed, and the cooling material and so on are enclosed in the hollow portion 115. Then, the shaft end part 120 is integrated with the shaft portion 111 (inseparable) to configure the shaft portion 111, and the engine valve 100 in which the cooling material and so on are enclosed is finished.

Incidentally, as necessary, the whole or a part of the engine valve 100 (the whole or a part of the umbrella portion 113, the whole or a part of the shaft portion 111, and so on) may be applied with a thermal insulation coating with metal having a low thermal conductivity such as ceramics, or a surface treatment such as nitriding treatment, grinding treatment and so on.

(Method for producing Valve Head Part 110 of Engine Valve 100)

A forming process of the valve head part 110 is roughly classified into a first step of forming a semifinished product 300 from a solid round rod 10 (see FIG. 2) and a second step of forming the valve head part 110 from the semifinished product 300 (see FIG. 3).

As shown in FIG. 2 (4), the semifinished product 300 has a tubular portion 301 that is a pre-processed form for the shaft portion 111 of the valve head part 110, a cylindrical hole 305 that is a pre-processed form for the hollow portion 115 of the valve head part 110, and an umbrella-shaped portion 303 that is a pre-processed form for the umbrella portion 113 of the valve head part 110.

The tubular portion 301 is formed in a straight cylindrical shape having an outer diameter of Φ D (for example, φ: 7 mm), an inner diameter (hole diameter) of Φ d (for example, φ: 5 mm), and a thickness of t1 (for example, 1.0 mm). The umbrella-shaped portion 303 is formed in the same shape as the umbrella portion 113.

(First Step)

In the first step of the present embodiment, by squeezing the solid round rod 10 made of special steel having a columnar shape shown in FIG. 2 (1), a squeezed solid rod 20 is formed to be provided with a semifinished shaft portion 21 that is reduced in an outer diameter to form a portion corresponding to the shaft portion 111 of the engine valve 100 and a head portion 23 of which an outer diameter is larger than that of the semifinished shaft portion 21 as shown in FIG. 2 (2). Moreover, by forging the squeezed solid rod 20, a flanged solid rod 30 is formed to be provided with an umbrella-shaped portion 33 that is formed from the head portion 23 of the squeezed solid rod 20 to have an umbrella shape by enlarging a diameter of the head portion 23 and a solid rod 31 that is formed by shortening the semifinished shaft portion 21 in an axis direction and enlarging a diameter of the semifinished shaft portion 21 as shown in FIG. 2 (3). Incidentally, in the squeezing and forging processes in the first step, a workpiece is put into a die K provided with a downward concave molding part S, and the workpiece is molded by pressing from above with a pressing apparatus (not shown) provided with a punch P. Moreover, by drilling the solid rod 31 after vertically inverting the flanged solid rod 30 shown in FIG. 2 (3), as shown in FIG. 2 (4), the cylindrical hole 305 having a bottom is provided in the axis direction with a twist drill M and so forth to form the tubular portion 301, and the semifinished product 300 is obtained. Incidentally, the umbrella-shaped portion 303 of the semifinished product 300 is in the same shape as the umbrella-shaped portion 33 of the flanged solid rod 30, and the tubular portion 301 has the same outer diameter as the solid rod 31.

Incidentally, in the first step of the present embodiment, the squeezing process may be omitted, and the cylindrical hole 305 may be formed before forming the umbrella-shaped portion 33. The forming process of the cylindrical hole 305 may have a step of forming an end portion of the solid round rod 10 in a cup-like shape by forging and a step of squeezing to make an outer wall rise, without the drilling process with a twist drill and so on.

(Second Step)

As shown in FIG. 3, in the second step, the tubular portion 301 is stepwisely reduced in the outer diameter to form the valve head part 110 by cold forging with a plurality of a die 51, a die 52, and a die 53 (referred to as "dies 51 to 53" together below). Incidentally, the number (the kind) of the dies may be suitably adjusted according to the number of process steps.

Each of the dies 51 to 53 has a molding hole 50 perforating through each of them vertically. The molding holes 50 respectively include a reduced diameter portion 50a having a fixed inner diameter and a tapered portion 50b enlarged in diameter downward from a lower end portion of the reduced diameter portion 50a. The reduced diameter portions 50a are possible to mold the first shaft portion 111a of the valve head part 110 by reducing in the outer diameter of the tubular portion 301 of the semifinished product 300, and the tapered portions 50b are possible to mold the stepped portion 111c of the valve head part 110. The dies 51 to 53 are respectively arranged according to progress of the process steps in the second step. A magnitude relation among the diameters of the respective molding holes 50 (the reduced diameter portion 50a and the tapered portion 50b) is the die 51>the die 52>the die 53.

In the second step, the semifinished product 320 shown in FIG. 3 (2) is formed by a reciprocating motion of the die 51 shown in FIG. 3 (1) between a position above the semifinished product 300 and a middle position (a specific position) C as a turning point on the semifinished product 300, a semifinished product 330 shown in FIG. 3 (3) is formed by a reciprocating motion of the die 52, and the valve head part 110 shown in FIG. 3 (4) is finally molded by a reciprocating motion of the die 53. Incidentally, the middle position C is possible to be shifted according to specification of the engine valve.

Concretely, each portion corresponding to the first shaft portion 111a and the stepped portion 111c of the valve head part 110 on the semifinished product 300 shown in FIG. 3 (1) is reduced in inner and outer diameters, is increased in a wall thickness (referred to as "thickened" below), and is elongated in the axis direction, thereby forming a semifinished product 320 shown in FIG. 3 (2) that has a semifinished first shaft portion 321a, a semifinished stepped portion 321c, and a semifinished hollow portion 325 provided with a stepped portion.

The semifinished first shaft portion 321a and the semifinished stepped portion 321c of the semifinished product 320 obtained in the previous step are respectively further reduced in inner and outer diameters, are further thickened, and are further elongated in the axis direction, thereby forming the semifinished product 330 shown in FIG. 3 (3) that has a semifinished first shaft portion 331a, a semifinished stepped portion 331c, and a semifinished hollow portion 335 provided with the stepped portion.

The semifinished first shaft portion 331a and the semifinished stepped portion 331c of the semifinished product 330 obtained in the previous step are respectively further reduced in inner and outer diameters, are further thickened, and are further elongated in the axis direction, thereby forming the valve head part 110 shown in FIG. 3 (4) that has the first shaft portion 111a, the stepped portion 111c, and the hollow portion 115 provided with the stepped portion.

Accordingly, the thickness t3 of the first shaft portion 111a and the thickness t2 of the stepped portion 111c are enabled to be larger than the thickness t1 of the second shaft portion 111b of the valve head part 110.

Thus, it is possible to improve the strength of the stepped portion 111c on which the maximum bending stress occurs, thereby reducing the deterioration and the damage of the engine valve 100.

Meanwhile, in the second step, the semifinished second shaft portions 321b, 331b and the umbrella-shaped portions 323, 333 of the semifinished products 320, 330 shown in FIG. 3 (2), (3) are not molding objects, and therefore each shape of these portions are maintained. Thus, the tubular portion 301, the semifinished second shaft portions 321b, 331b, and the second shaft portion 111b are respectively the same in the outer diameter of Φ D and the inner diameter of Φ d, and the umbrella-shaped portions 303, 323, 333 and the umbrella portion 113 are respectively in the same shape.

Second Embodiment

Figure 4:
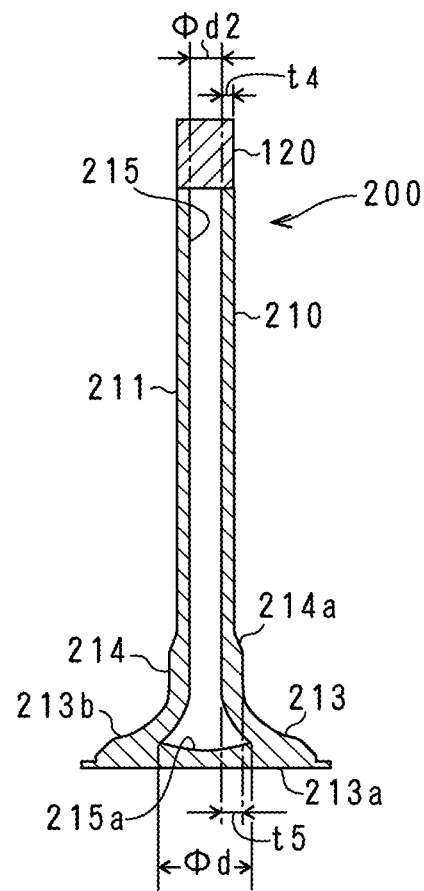
FIG. 4 is a vertical cross-sectional view showing a hollow engine valve of a second embodiment.
Figure 5:
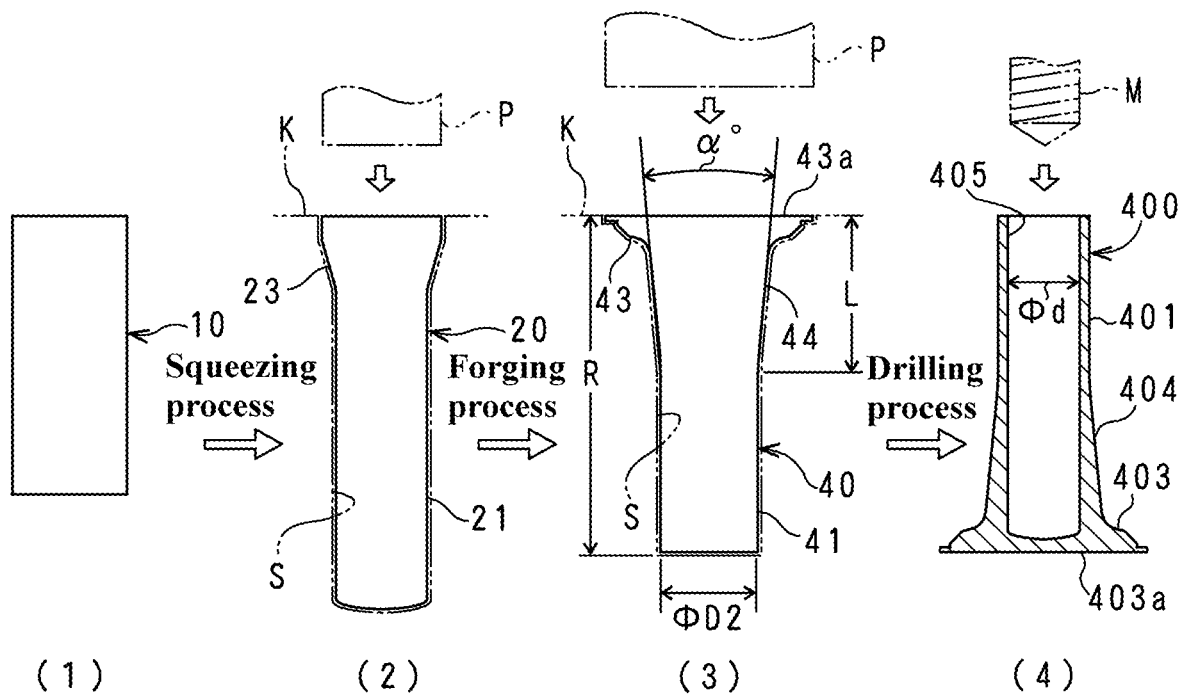
FIG. 5 is a schematic view showing a production process of the hollow engine valve of the second embodiment.
Figure 6:
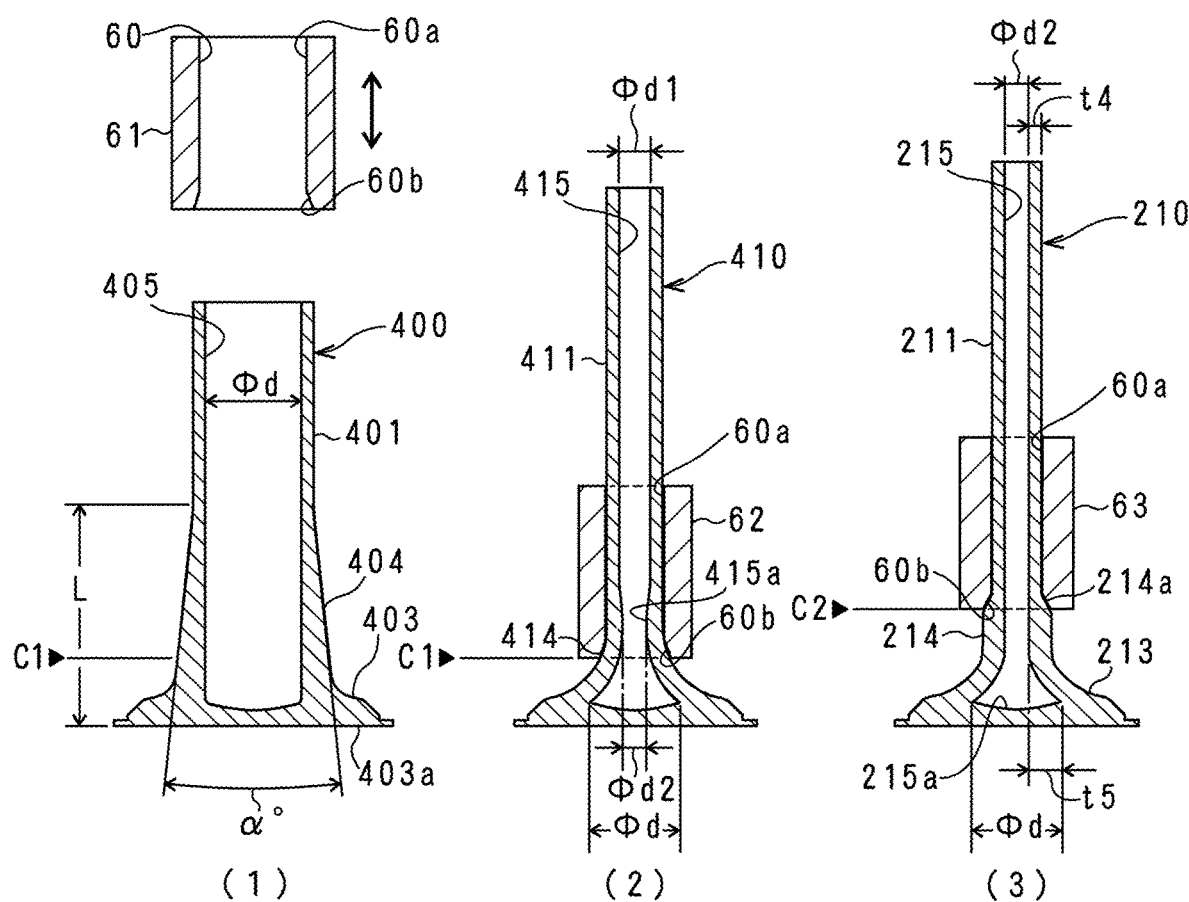
FIG. 6 is another schematic view showing the production process of the hollow engine valve of the second embodiment.

With reference to FIGS. 4 to 6, an engine valve 200 of a second embodiment is explained.

Incidentally, the engine valve 200 of the present embodiment is different in shape and processing method of the valve head part 210 from those of the engine valve 100 of the first embodiment while being common in other forms (such as the shaft end part 120, cooling material, thermal insulation coating, etc.) with the engine valve 100 of the first embodiment. Therefore, explanations regarding the shared forms are omitted. Directions of the hollow engine valve 200 of the present embodiment are explained based on those of the engine valve 200 (the valve head part 210) shown in FIG. 4 (for example, a tip end side (a side of a shaft end part 120) of a shaft portion 211 is indicated as an upper direction, and a base end side (a side of an umbrella portion 213) of the shaft portion 211 is indicated as a lower direction).

As shown in FIG. 4, the valve head part 210 includes the shaft portion (a main shaft portion) 211 in a round rod shape and the umbrella portion 213 which is formed continuously from a lower end portion of the shaft portion 211 and of which diameter is enlarged downward to form a concentric umbrella shape.

A head face surface 213a in a flat shape and a head back surface 213b in an umbrella shape are respectively provided as a lower-end surface and an upper-end surface of the umbrella portion 213. When the engine valve 200 is mounted in a port of a cylinder head of an engine, the engine valve 200 is arranged such that the head face surface 213a faces the combustion chamber side of the engine and the head back surface 213b faces the port side.

As shown in FIG. 4, a neck portion 214 is formed at the lower end portion of the shaft portion 211 continuously from an upper portion of the head back surface 213b to have an outer diameter larger than that of the shaft portion 211. Between the neck portion 214 and the shaft portion 211 on which the neck portion 214 is not provided, a stepped portion 214a of which diameter is reduced upward to form a tapered shape is formed to continuously provide both portions 211, 214 of which the outer diameters are different.

Thickness t5 (for example, 1.8 mm) of the neck portion 214 is larger than thickness t4 (for example, 1.6 mm) of the shaft portion 211 (t4<t5).

Thus, by providing the neck portion 214 with the large thickness on the engine valve 200, it is possible to improve strength of the neck portion 214 on which temperature rises to the highest level, thereby reducing deterioration and damage of the engine valve 200.

A hollow portion 215 having an opening on its upper portion is formed from the shaft portion 211 to the umbrella portion 213 inside the valve head part 210. The hollow portion 215 has a bottom, has a fixed inner diameter of Φd2 (a predetermined fixed inner diameter, for example, φ: 3 mm) in the shaft portion 211 (including the neck portion 214), and is enlarged in diameter downward (toward a bottom portion) in the umbrella portion 213 such that an inner diameter of Φ d (for example, φ: 10 mm) of the bottom portion 215a is the largest in the hollow portion 215.

Thus, it is possible to secure a capacity of the hollow portion 215 of the umbrella portion 213, thereby enclosing a certain quantity of a getter material (for example, titanium powder and so on) and/or a cooling material (for example, metallic sodium and so on) in the hollow portion 215. Moreover, there is no step and so on in the hollow portion 215 in the shaft portion 211, it is possible to make the cooling material move smoothly in the hollow portion 215, thereby improving a cooling efficiency for the engine valve 200 owing to a shaking effect.

(Method for producing Valve Head Part 210 of Engine Valve 200)

A forming process for the valve head part 210 of the present embodiment includes a first step of forming a semifinished product 400 from a solid round rod 10 (see FIG. 5) and a second step of forming the valve head part 210 from the semifinished product 400 (see FIG. 6).

The first step shown in FIG. 5 is performed in the same procedure as the first step of the first embodiment, and therefore a detailed explanation is omitted. Moreover, the solid round rod 10 shown in FIG. 5 (1) and a squeezed solid rod 20 shown in FIG. 5 (2) respectively have the same configuration as those of the first embodiment, and therefore detailed explanations are omitted.

By forging the squeezed solid rod 20 shown in FIG. 5 (2), a flanged solid rod 40 shown in FIG. 5 (3) is formed to be provided with an umbrella-shaped portion 43 having an umbrella shape by enlarging the diameter of the head portion 23 and a solid rod 41 that is formed by shortening a semifinished shaft portion 21 in an axis direction and enlarging a diameter of the semifinished shaft portion 21. Moreover, a neck tapered portion 44 is formed in a side of the umbrella-shaped portion 43 (a base end side) of the solid rod 41 to be reduced in outer diameter from the umbrella-shaped portion 43 toward the solid rod 41 (a tip end side). At this moment, the neck tapered portion 44 is elongated by a distance L (for example, 17 mm: approximately one-third of a total length R) from the head face surface 43a of the umbrella-shaped portion 43 against the total length R (for example, 48 mm) of the flanged solid rod 40, and is exponentially inclined at a taper angle of a degrees (for example, 3 degrees). Thus, the neck tapered portion 44 is gradually increased in wall thickness toward the base end.

Moreover, by drilling the solid rod 41 after vertically inverting the flanged solid rod 40 shown in FIG. 5 (3), the semifinished product 400 shown in FIG. 5 (4) is provided with a cylindrical hole 405 having an inner diameter of Φd to form a tubular portion 401 that is cylindrical. Moreover, the semifinished product 400 has the same outer shape as the flanged solid rod 40, and therefore has a neck tapered portion 404 in the same shape as the neck tapered portion 44.

(Second Step)

As shown in FIG. 6, in the second step, the tubular portion 401 is stepwisely reduced in the outer diameter to form the valve head part 210 by cold forging with a plurality of a die 61, a die 62, and a die 63 (referred to as "dies 61 to 63" together below). Incidentally, the number (the kind) of the dies may be suitably adjusted according to the number of processes.

Each of the dies 61 to 63 has a molding hole 60 perforating through each of them vertically. The molding holes 60 respectively include a reduced diameter portion 60a having a fixed inner diameter and a tapered portion 60b enlarged in diameter downward from a lower end portion of the reduced diameter portion 60a. The reduced diameter portions 60a are possible to mold the shaft portion 211 and the neck portion 214 of the valve head part 210 by reducing in an outer diameter of the tubular portion 401 and the neck tapered portion 404 of the semifinished product 400 according to the kinds of the dies. The tapered portions 60b are possible to mold a part of a semifinished neck portion 414 of a semifinished product 410 described below shown in FIG. 6 (2) and the stepped portion 214a of the valve head part 210 shown in FIG. 6 (3). The dies 61 to 63 are respectively arranged according to progress of the process steps in the second step. A magnitude relation among the diameters of the respective molding holes 60 (the reduced diameter portion 60a and the tapered portion 60b) is the die 61>the die 62>the die 63.

In the second step, the semifinished product 410 shown in FIG. 6 (2) is formed (referred to as "first shaping" below) by a reciprocating motion of the die 61 shown in FIG. 6 (1) (after forging by the die 61, the die 62 is used) between a position above the semifinished product 400 and a first position C1 as a turning point on the semifinished product 400 (the semifinished product 410), and the valve head part 210 shown in FIG. 6 (3) is molded (referred to as "second shaping" below) by a reciprocating motion of the die 63 in which a second position C2 above the first position C1 on the semifinished product 410 is set as a turning point. Incidentally, the second position C2 is possible to be shifted according to a specification of the engine valve.

Concretely, in the first shaping, each portion corresponding to the shaft portion 211 and the neck portion 214 of the valve head part 210 on the semifinished product 400 shown in FIG. 6 (1) is stepwisely reduced in inner and outer diameters, is thickened, and is elongated in the axis direction by the dies 61 and 62, thereby molding a semifinished shaft portion 411 having an inner diameter of Φ d1 and the semifinished neck portion 414 having an inner diameter of Φ d2 to form the semifinished product 410.

In this molding step, the semifinished neck portion 414 is larger in thickness than the semifinished shaft portion 411 owing to the wall thickness of the neck tapered portion 404 of the semifinished product 400. Moreover, although the outer diameters of the semifinished shaft portion 411 and the semifinished neck portion 414 are made to be the same to the vicinity of the first position C1 (within the movement of the reduced diameter portion 60a of the die 62) by the die 62, the inner diameter of Φ d2 of the semifinished neck portion 414 is made to be smaller than the inner diameter of Φ d1 of the semifinished shaft portion 411 by a narrowed portion 415a that is narrowed inward.

That is, in the first shaping, the tubular portion 401 is subjected to a cold forging such that the inner diameter of the semifinished neck portion 414 is made to be Φ d2.

Next, in the second shaping, the semifinished shaft portion 411 on an upper side of the semifinished neck portion 414 of the semifinished product 410 shown in FIG. 6 (2) is further reduced in inner and outer diameters, is further thickened, and is further elongated in the axis direction by the die 63, thereby forming the shaft portion 211, the neck portion 214, and the stepped portion 214a that respectively have the inner diameter of Φ d2.

That is, in the second shaping, the semifinished shaft portion 411 is subjected to a cold forging such that the inner diameter of the entire shaft portion 211 is made to be Φ d2. Incidentally, in the second step, an outer shape of an umbrella-shaped portion 403 of the semifinished product 400 and the inner diameter of Φ d of the cylindrical hole 405 are respectively maintained as an outer shape of the umbrella portion 213 of the valve head part 210 and the inner diameter of the bottom portion 215a of the hollow portion 215.

Accordingly, by making the wall thickness of the neck portion 214 larger than that of the shaft portion 211, it is possible to improve strength of the neck portion 214 on which temperature rises to the highest level, and the valve head part 210 of the present embodiment enables the engine valve 200 to be reduced in deterioration and damage.

Moreover, by gradually increasing the inner diameter of the hollow portion 215 formed in a range from the neck portion 214 to the umbrella portion 213 toward the bottom portion 215a in which the inner diameter of Φ d is maintained and securing a capacity of the hollow portion 215, it is possible to enclose a certain quantity of the getter material (for example, titanium powder and so on) and/or the cooling material (for example, metallic sodium and so on).

Furthermore, since the hollow portion 215 in a range from the shaft portion 211 to the neck portion 214 is made to have the fixed inner diameter of Φ d2, it is possible to make the cooling material move smoothly in the hollow portion 215 during the engine operation, and thereby improving a cooling efficiency for the engine valve 200 owing to a shaking effect.

What is claimed is:

1. A hollow engine valve comprising a shaft portion and an umbrella portion of which diameter is enlarged to form an umbrella shape to be provided on a base end of the shaft portion, a cooling material being enclosed in a hollow portion that is at least formed inside the shaft portion,
wherein the shaft portion comprises a first shaft portion in a tip end side, a second shaft portion that is provided in a base end side to have an outer diameter larger than that of the first shaft portion, and a stepped portion formed by a difference in the outer diameters between the first and second shaft portions, and
wherein each wall thickness of the first shaft portion and the stepped portion is larger than that of the second shaft portion.

2. A method for producing a hollow engine valve recited in claim 1, the hollow engine valve comprising a shaft portion that has a first shaft portion and a second shaft portion formed continuously from the first shaft portion to have an outer diameter larger than that of the first shaft portion, an umbrella portion of which diameter is enlarged to form an umbrella shape to be provided on an end of the second shaft portion, a stepped portion formed by a difference in the outer diameters between the first and second shaft portions, and a hollow portion that is at least formed inside the shaft portion, each wall thickness of the first shaft portion and the stepped portion being larger than that of the second shaft portion,
wherein the method comprises a first step of forming a semifinished product provided with a tubular portion that is cylindrical to have the same outer diameter as the second shaft portion and an umbrella-shaped portion that is arranged on an end of the tubular portion to be in the same shape as the umbrella portion, by forging and drilling a raw material made of special steel, and a second step of forming the shaft portion by drawing the tubular portion of the semifinished product to be reduced in the outer diameter,
wherein in the second step, the tubular portion is reduced in the outer diameter to a predetermined specified position in an axial direction of the tubular portion, and the tubular portion is processed to have the first shaft portion that is a portion reduced in the outer diameter, the second shaft portion that is a portion not reduced in the outer diameter, and a stepped portion that is reduced in the outer diameter together with the first shaft portion and is formed by a difference in the outer diameters between the first and second shaft portions, and wherein each wall thickness of the first shaft portion and the stepped portion which are respectively reduced in the outer diameter is made to be larger than that of the second shaft portion.

3. The method according to claim 2, wherein in the second step, the first shaft portion and the stepped portion are formed by cold forging a predetermined portion of the tubular portion such that both outer and inner diameters of the predetermined portion are reduced and a wall thickness of the predetermined portion is increased.

4. The hollow engine valve according to claim 1, wherein the hollow engine valve is formed from a semi-finished product provided with a tubular portion that is cylindrical to have the same outer diameter as the second shaft portion and an umbrella-shaped portion that is arranged on an end of the tubular portion to be in the same shape as the umbrella portion, wherein the first shaft portion and the stepped portion are portions formed from a predetermined portion of the tubular portion such that both outer and inner diameters of the predetermined portion are reduced and a wall thickness of the predetermined portion is increased by cold forging, and wherein the second shaft portion is a remaining portion of the tubular portion which is not reduced in the outer diameter.

5. A hollow engine valve comprising a shaft portion and an umbrella portion of which diameter is enlarged to form an umbrella shape to be provided on a base end of the shaft portion, a cooling material being enclosed in a hollow portion that is formed inside the shaft portion and the umbrella portion, wherein the shaft portion comprises a main shaft portion in a tip end side and a neck portion that is formed continuously from the umbrella portion to have an outer diameter larger than that of the main shaft portion, wherein a wall thickness of the neck portion is larger than that of the main shaft portion, and, wherein the hollow portion is formed to have an inner diameter which is fixed from the main shaft portion to the neck portion and is gradually increased from the neck portion to the umbrella portion toward a bottom portion.

6. A method for producing a hollow engine valve recited in claim 5, the hollow engine valve comprising a shaft portion and an umbrella portion of which diameter is enlarged to form an umbrella shape to be provided on a base end of the shaft portion, a cooling material being enclosed in a hollow portion that is formed inside the shaft portion and the umbrella portion, the shaft portion comprising a main shaft portion in a tip end side and a neck portion that is formed continuously from the umbrella portion to have an outer diameter larger than that of the main shaft portion, a wall thickness of the neck portion being larger than that of the main shaft portion, and the hollow portion being formed to have an inner diameter which is fixed from the main shaft portion to the neck portion as a predetermined fixed inner diameter and is gradually increased from the neck portion to the umbrella portion toward a bottom portion, wherein the method comprises a first step of forming a semifinished product provided with a tubular portion that is cylindrical to have an opening at a tip end and an umbrella-shaped portion of which diameter is enlarged to form an umbrella shape to be provided on a base end of the tubular portion, the semifinished product being provided with a cylindrical hole having a bottom to have a fixed hole diameter from the opening to the umbrella-shaped portion, by forging and drilling a raw material made of special steel, and a second step of forming the main shaft portion and the neck portion by drawing the tubular portion to be reduced in the outer diameter, wherein in the first step, a neck tapered portion is formed in the base end side of the tubular portion to have a wall thickness larger than that of the tubular portion and an outer diameter exponentially reduced in a tip direction, and wherein the second step comprises a first shaping to form a semifinished neck portion by reducing the outer diameter of the tubular portion including the neck tapered portion such that an inner diameter of the neck tapered portion is reduced to be the fixed inner diameter, and a second shaping to reduce the outer diameter of the tubular portion in a tip end side than the semifinished neck portion such that an inner diameter of the tubular portion is reduced to be the fixed inner diameter, and to make the main shaft portion that is a portion reduced in the outer diameter and the neck portion that is a portion not reduced in the outer diameter, thereby forming the hollow portion having the inner diameter which is fixed from the main shaft portion to the neck portion and is gradually increased from the neck portion to the umbrella portion to be the same as the hole diameter of said cylindrical hole of the semi-finished product.

7. The hollow engine valve according to claim 5, wherein the hollow engine valve is formed from a semi-finished product provided with a tubular portion that is cylindrical to have an opening at a tip end, an umbrella-shaped portion of which diameter is enlarged to form an umbrella shape to be provided on a base end of the tubular portion, and a neck tapered portion formed in the base end side of the tubular portion to have a wall thickness larger than that of the tubular portion and an outer diameter exponentially reduced in a tip direction, and wherein the neck portion is formed from the neck tapered portion such that the neck tapered portion is reduced in the outer diameter to have the fixed inner diameter by cold forging and the main shaft portion is formed from the tubular portion in a tip end side than the neck tapered portion such that said tubular portion is reduced in the outer diameter to have the fixed inner diameter by cold forging.

8. The hollow engine valve according to claim 7, wherein the semi-finished product is provided with a cylindrical hole having a bottom to have a fixed hole diameter from the opening to the umbrella-shaped portion, and by providing the neck portion and the main shaft portion on the semi-finished product, it is formed the hollow portion having the inner diameter which is fixed from the main shaft portion to the neck portion and is gradually increased from the neck portion to the umbrella portion to be the same as the hole diameter of said cylindrical hole.

9. The hollow engine valve according to claim 5, wherein there is no step in the hollow portion.

* * * * *